US012199353B2

(12) United States Patent
Xue et al.

(10) Patent No.: US 12,199,353 B2
(45) Date of Patent: *Jan. 14, 2025

(54) MULTI-BAND ANTENNA AND MOBILE TERMINAL

(71) Applicant: HUAWEI TECHNOLOGIES CO., LTD., Shenzhen (CN)

(72) Inventors: Liang Xue, Shanghai (CN); Dong Yu, Shanghai (CN); Lijun Ying, Shanghai (CN); Meng Hou, Shanghai (CN); Jiaqing You, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,296

(22) Filed: Mar. 9, 2023

(65) Prior Publication Data

US 2023/0216196 A1 Jul. 6, 2023

Related U.S. Application Data

(63) Continuation of application No. 16/957,492, filed as application No. PCT/CN2018/124026 on Dec. 26, 2018, now Pat. No. 11,626,662.

(30) Foreign Application Priority Data

Dec. 28, 2017 (WO) ................ PCT/CN2017/119444

(51) Int. Cl.
*H01Q 5/25* (2015.01)
*H01Q 5/335* (2015.01)

(52) U.S. Cl.
CPC ............... *H01Q 5/335* (2015.01); *H01Q 5/25* (2015.01)

(58) Field of Classification Search
CPC ............ H01Q 5/335; H01Q 5/25; H01Q 1/44; H01Q 1/52; H01Q 5/392; H01Q 9/42;
(Continued)

(56) References Cited

U.S. PATENT DOCUMENTS 11,626,662 B2 * 4/2023 Xue ....................... H01Q 1/243 343/702
2009/0027286 A1 1/2009 Ohishi et al.
(Continued)

FOREIGN PATENT DOCUMENTS

CN 1977425 A 6/2007
CN 101355196 A 1/2009
(Continued)

OTHER PUBLICATIONS

Du Mingde et al., "Designof multi-band mobile handset antenna based on novel volume reuse technique", Aug. 20, 2011, Journal of Sichuan University (Natural Science Edition), total:6pages.

*Primary Examiner* — Hai V Tran
*Assistant Examiner* — Michael M Bouizza
(74) *Attorney, Agent, or Firm* — Rimon PC

(57) ABSTRACT

This application provides a multi-band antenna. The antenna includes a feeder and a radiating element connected to the feeder, and further includes: a first notch structure, where the first notch structure is located on a side of the radiating element and is coupled to the radiating element; and a second notch structure, where the second notch structure is located on a far side of the first notch structure from the radiating element, and a far end of the second notch structure from the radiating element is grounded. The first notch structure may be selectively connected to the ground or to the second notch structure.

18 Claims, 13 Drawing Sheets

(58) Field of Classification Search
CPC ............ H01Q 1/243; H01Q 1/36; H01Q 1/22; H01Q 1/48; H01Q 1/50; H01Q 5/20; H01Q 5/314
See application file for complete search history.

(56) References Cited

U.S. PATENT DOCUMENTS

| | | | |
|---|---|---|---|
| 2012/0007786 A1 | 1/2012 | Ando et al. | |
| 2014/0162734 A1* | 6/2014 | Shewan | H01Q 9/0421 343/702 |
| 2016/0064820 A1 | 3/2016 | Kim et al. | |
| 2016/0156101 A1 | 6/2016 | Tsai et al. | |
| 2016/0164166 A1 | 6/2016 | Lee et al. | |
| 2017/0373388 A1 | 12/2017 | Wang | |
| 2018/0115054 A1* | 4/2018 | Wu | H01Q 5/35 |
| 2019/0027830 A1 | 1/2019 | Wang | |
| 2019/0027833 A1* | 1/2019 | Ayala Vazquez | H01Q 5/342 |
| 2020/0099125 A1 | 3/2020 | Ying | |

FOREIGN PATENT DOCUMENTS

| | | | |
|---|---|---|---|
| CN | 102187519 | A | 9/2011 |
| CN | 103441327 | A | 12/2013 |
| CN | 103633451 | A | 3/2014 |
| CN | 103891043 | A | 6/2014 |
| CN | 104218311 | A | 12/2014 |
| CN | 204271247 | U | 4/2015 |
| CN | 104882675 | A | 9/2015 |
| CN | 105024168 | A | 11/2015 |
| CN | 105633582 | A | 6/2016 |
| CN | 105826685 | A | 8/2016 |
| CN | 105977639 | A | 9/2016 |
| CN | 106159442 | A | 11/2016 |
| CN | 106207440 | A | 12/2016 |
| CN | 106252888 | A | 12/2016 |
| CN | 107181045 | A | 9/2017 |
| CN | 107210517 | A | 9/2017 |
| EP | 2940795 | A1 | 11/2015 |
| EP | 3229314 | A1 | 10/2017 |
| WO | 2008065871 | A1 | 6/2008 |
| WO | 2011073645 | A2 | 6/2011 |
| WO | 2015096101 | A1 | 7/2015 |

* cited by examiner

MULTI-BAND ANTENNA AND MOBILE TERMINAL

CROSS-REFERENCE TO RELATED APPLICATIONS

This application is a continuation of U.S. patent application Ser. No. 16/957,492, filed on Jun. 24, 2020, which is a national stage of International Application No. PCT/CN2018/124026, filed on Dec. 26, 2018. International Application No. PCT/CN2018/124026 claims priority to International Application No. PCT/CN2017/119444, filed on Dec. 28, 2017. All of the aforementioned patent applications are hereby incorporated by reference in their entireties.

TECHNICAL FIELD

This application relates to the field of communications technologies, and in particular, to a multi-band antenna and a mobile terminal.

BACKGROUND

In recent years, mobile phones are developing towards higher screen-to-body ratios. This causes an antenna clearance to become increasingly small, deteriorating performance of a primary antenna in a free space state. As a result, specification requirements of an operator cannot be met. In addition, in a case of a low frequency, radiation is on an entire board of a mobile phone. Therefore, a portion of a current is coupled to a metal bezel on a side. In a beside head and hand (BHH) state, when a hand holds the metal bezel on the side, some efficiency is absorbed.

A notch structure is a grounded stub formed on a side of a mobile phone or at the bottom of a mobile phone by using a metal bezel, a flexible circuit board, a laser direct structuring technology, or the like. A length of the notch structure is approximately a quarter of a wavelength of a low frequency. A purpose of the notch structure is to attract a portion of a current of the low frequency, to reduce intensity of a current at a holding position at the bottom of the mobile phone, thereby reducing a low-frequency amplitude drop due to hand holding and improving BHH performance. If the length of the notch structure is limited, the frequency may alternatively be pulled low by connecting a large-inductance inductor in series. The notch structure performs better in a better environment.

However, when a notch structure in the prior art is designed, the notch structure can improve only one frequency band that is close to a resonance frequency of the notch structure. Since an antenna in the prior art usually has a plurality of frequency bands, improvement brought by the notch structure is not desirable, and communication performance of the antenna is affected.

SUMMARY

This application provides a multi-band antenna and a mobile terminal, to improve communication performance of the multi-band antenna.

According to a first aspect, a multi-band antenna is provided. The antenna includes a feeder and a radiating element connected to the feeder, and further includes:

a first notch structure, where the first notch structure is located on a side of the radiating element and connected to the radiating element in a coupling manner; and a second notch structure, where the second notch structure is located on a side that is of the first notch structure and that is far from the radiating element, and an end that is of the second notch structure and that is far from the radiating element is grounded, where the first notch structure may be selectively connected to the ground or to the second notch structure, and when the first notch structure is connected to the second notch structure, the first notch structure is connected to the second notch structure by using a first tuning device.

In the foregoing technical solutions, the disposed first notch structure can be selectively connected to the disposed second notch structure and the ground, so as to optimize BHH performance of all low frequencies, improve free space performance, and further improve performance of the multi-band antenna.

In a specific implementation solution, the antenna has a plurality of specified frequencies, the highest specified frequency is a first specified frequency, the lowest specified frequency is a second specified frequency, a frequency of the second notch structure is a frequency that is higher than the first specified frequency by a first threshold, and a frequency of the first notch structure is a frequency that is lower than the second specified frequency by a second threshold. Performance of the antenna is improved.

In a specific implementation solution, the first specified frequency is a frequency corresponding to a B8 frequency band, and the second specified frequency is a frequency corresponding to a B28 frequency band.

In a specific implementation solution, a frequency of the first threshold is within 0 MHz to 300 MHz, and a frequency of the second threshold is within 0 MHz to 300 MHz.

In a specific implementation solution, the antenna further includes a second tuning device, where the second tuning device includes a plurality of first parallel-connected branches and a first selection switch, and the plurality of first parallel-connected branches may be same or different branches, where the first notch structure selects, by using the first selection switch, one of the plurality of first parallel-connected branches for grounding. With the second tuning device, a resonance frequency of the first notch structure when being grounded is changed.

In a specific implementation solution, the antenna has a plurality of specified frequencies, and when the antenna is at any one of the plurality of specified frequencies, a resonance frequency of a component formed when the first notch structure is connected to the second tuning device is a frequency that is lower by a first threshold than the specified frequency at which the antenna is. With the second tuning device, a resonance frequency of the first notch structure when being grounded is changed, and performance of the antenna is improved.

In a specific implementation solution, the first tuning device includes a plurality of second parallel-connected branches and a second selection switch, and the plurality of second parallel-connected branches may be same or different branches, where the second notch structure selects, by using the second selection switch, one of the plurality of second parallel-connected branches to connect to the second notch structure. With the first tuning device, a resonance frequency of a component formed when the first notch structure is connected to the second notch structure is changed.

In a specific implementation solution, the antenna has a plurality of specified frequencies, and when the antenna is at any one of the plurality of specified frequencies, a resonance frequency of a component formed when the first notch structure is connected to the second notch structure by using the first tuning device is a frequency that is lower by a first threshold than the specified frequency at which the antenna is. Performance of the antenna is improved.

In a specific implementation solution, the first tuning device further includes a plurality of third parallel-connected branches that are connected to the ground, and the plurality of third parallel-connected branches may be same or different branches, where the first notch structure selects, by using the second selection switch, one of the plurality of third parallel-connected branches for connection.

In a specific implementation solution, the antenna has a plurality of specified frequencies, and when the antenna is at any one of the plurality of specified frequencies, a resonance frequency of a component formed when the first notch structure is connected to the third branch is a frequency that is lower by a first threshold than the specified frequency at which the antenna is.

In a specific implementation solution, the antenna further includes a third notch structure, the third notch structure is located at an end that is of the radiating element and that is far from the first notch structure, and an end that is of the third notch structure and that is far from the radiating element is grounded. Performance of the antenna is further improved.

In a specific implementation solution, the antenna further includes a third tuning device, where the third tuning device includes a plurality of fourth parallel-connected branches and a third selection switch, and the plurality of fourth parallel-connected branches may be same or different branches, where the third notch structure selects, by using the third selection switch, one of the plurality of fourth parallel-connected branches for grounding. Performance of the antenna is further improved.

In a specific implementation solution, the antenna has a plurality of specified frequencies, and when the antenna is at any one of the plurality of specified frequencies, a resonance frequency of a component formed when the first notch structure is connected to the third tuning device is a frequency that is lower by a first threshold than the specified frequency at which the antenna is.

When the radiating element, the first notch structure, and the second notch structure are disposed, the first notch structure and the radiating element are an integrated structure; and a difference between L1 and L2 approximates a third specified threshold, where L1 is a current path length of the second notch structure; and L2 is a length of a current path from a connection point between the feeder and the radiating element to a first end of the first notch structure, where the first end of the first notch structure is an end that is of the first notch structure and that is near the second notch structure.

In addition, a first transfer switch is disposed on the second notch structure, and a second transfer switch is disposed on the radiating element; and the second notch structure and the radiating element further meet: a difference between L3 and L4 approximates a fourth specified threshold, where L3 is a length of a current path from a connection point between the first transfer switch and the second notch structure to an end that is of the second notch structure and that is far from the radiating element; and L4 is a length of a current path from the second transfer switch to the first end of the first notch structure. With the disposed first transfer switch and second transfer switch, a switchover between a high frequency and a low frequency is implemented.

In a specific implementation solution, the antenna further includes a third notch structure, where the third notch structure is located at an end that is of the radiating element and that is far from the second notch structure, the third notch structure is connected to the radiating element in a coupling manner, and an end that is of the third notch structure and that is far from the radiating element is grounded, where a difference between L5 and L6 approximates the third specified threshold, where L5 is a current path length of the third notch structure; and L6 is a length of a current path from a connection point between the feeder and the radiating element to a second end of the radiating element, where the second end of the radiating element is an end that is of the radiating element and that is near the third notch structure. With the disposed third notch structure, communication performance of the antenna is improved.

In addition, a third transfer switch is disposed on the third notch structure, and a fourth transfer switch is disposed on the radiating element; and the third notch structure and the radiating element further meet: a difference between L7 and L8 approximates the fourth specified threshold, where L7 is a length of a current path from a connection point between the third transfer switch and the third notch structure to an end that is of the third notch structure and that is far from the radiating element; and L8 is a length of a current path from the fourth transfer switch to the second end of the radiating element. With the disposed third transfer switch and fourth transfer switch, a switchover between a high frequency and a low frequency is implemented.

According to a second aspect, a mobile terminal is provided. The mobile terminal includes the antenna according to any one of the foregoing implementation solutions.

In the foregoing technical solutions, the disposed first notch structure can be selectively connected to the disposed second notch structure and the ground, so as to optimize BHH performance of all low frequencies, improve free space performance, and further improve performance of the multi-band antenna.

DESCRIPTION OF EMBODIMENTS

To make the objectives, technical solutions, and advantages of this application clearer, the following further describes this application in detail with reference to the accompanying drawings. Apparently, the described embodiments are merely some rather than all of the embodiments of this application. All other embodiments obtained by a person of ordinary skill in the art based on the embodiments of this application without creative efforts shall fall within the protection scope of this application.

For ease of understanding of a multi-band antenna provided in the embodiments of this application, several states of antenna performance detection are first described. One is a free space (FS) state. In this case, a mobile terminal is directly placed without contact with a human body. Another is a beside head and hand (BHH) state. This state simulates a state in which a mobile terminal is used by a person. Therefore, the BHH state is divided into a beside head and hand left (BHHL) state and a beside head and hand right (BHHR) state. In addition, for a frequency band of the antenna, frequency bands such as B8, B20, and B28 are involved in the embodiments of this application. Each frequency band includes a transmit frequency band (TX) and a receive frequency band (RX). Specific frequency band ranges are as follows: B8: TX frequency band: 880 MHz to 915 MHZ, RX frequency band: 925 MHz to 960 MHz; B20: TX frequency band: 824 MHz to 849 MHz, RX frequency band: 869 MHz to 894 MHz; and B28: TX frequency band: 708 MHz to 743 MHZ, RX frequency band: 763 MHz to 798 MHz.

Figure 1:
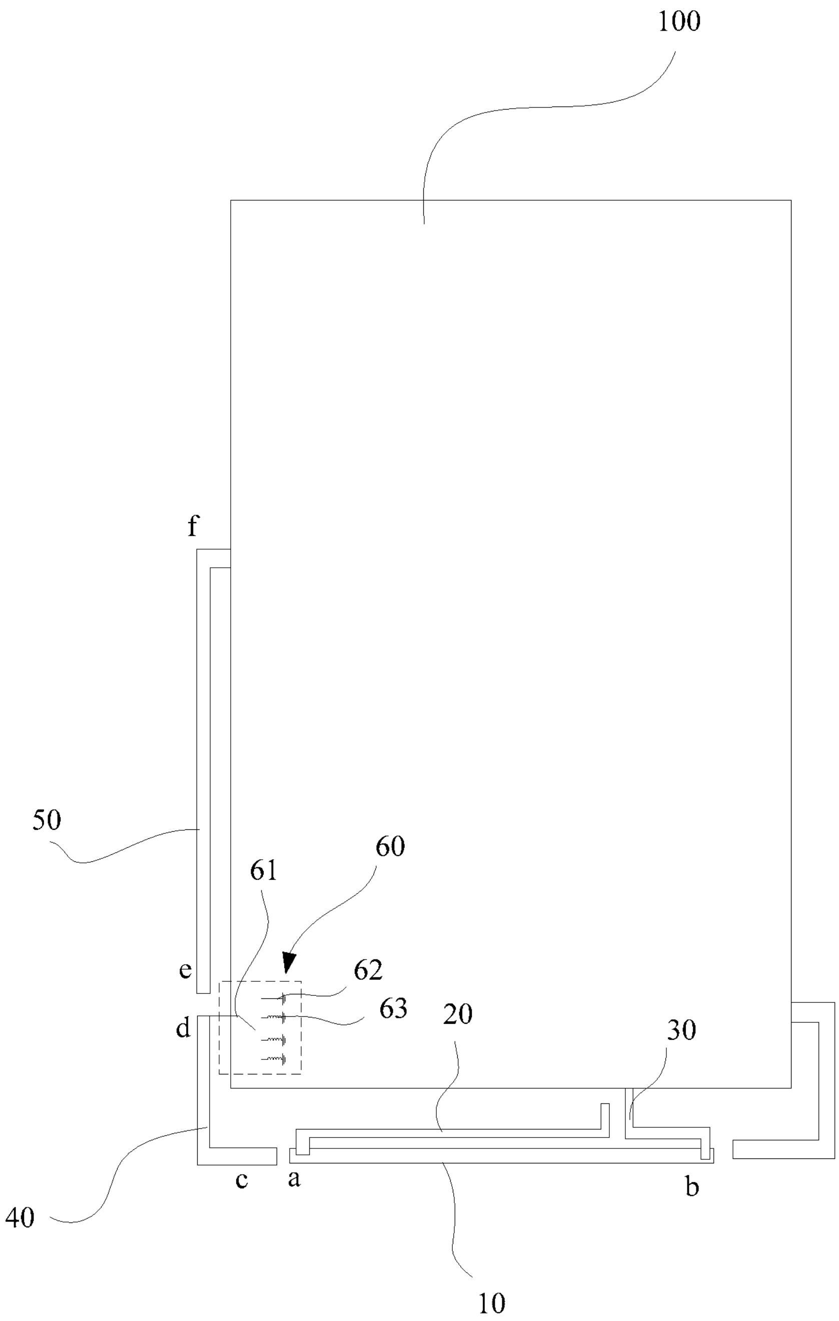
FIG. 1 is a schematic diagram of an antenna structure according to an embodiment of this application.
Figure 3:
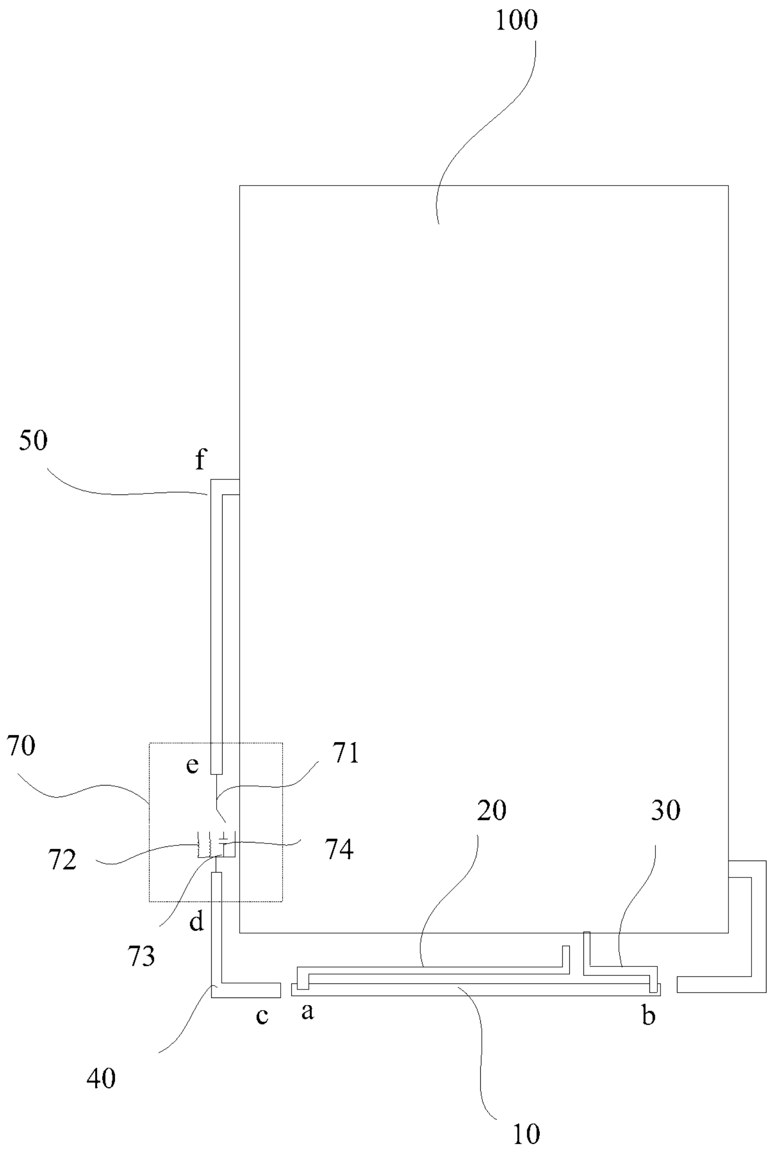
FIG. 3 is a schematic diagram of another antenna structure according to an embodiment of this application.

As shown in FIG. 1, an embodiment of this application provides a multi-band antenna. The multi-band antenna includes a feeder 30 and a radiating element 10 connected to the feeder 30. To improve a function of the antenna provided in this embodiment of this application, two notch structures are further disposed on the antenna provided in this embodiment of this application, namely, a first notch structure 40 and a second notch structure 50. The first notch structure 40 is located on a side of the radiating element 10 and connected to the radiating element 10 in a coupling manner. When the first notch structure 40 is connected to the radiating element 10 in a coupling manner, the radiating element 10 and the first notch structure 40 are not directly connected, and there is a gap between the radiating element 10 and the first notch structure 40. The second notch structure 50 is located on a side that is of the first notch structure 40 and that is far from the radiating element 10. In addition, an end that is of the second notch structure 50 and that is far from the first notch structure 40 is grounded. The first notch structure 40 may be grounded or connected to the second notch structure 50. In this way, a current path length of a notch structure can be adjusted, to meet requirements of different frequency bands. As shown in FIG. 3, when the first notch structure 40 is connected to the second notch structure 50, this is equivalent to one notch structure. In specific connecting, the first notch structure 40 is connected to the second notch structure 50 by using a first tuning device 70. As shown in FIG. 1, when the first notch structure 40 is grounded and a tail end (an end far from the grounded end) of the second notch structure 50 is not connected, this is equivalent to two notch structures.

For ease of description, endpoints of different structures of the antenna are defined in this embodiment of this application. As shown in FIG. 1, in the radiating element 10, a connection point connected to the feeder 20 is a, and a point connected to a ground cable 30 is b. In the first notch structure 40, an end near the point a is an endpoint c, and an end far from the point a is an endpoint d. In the second notch structure 50, an end near the endpoint d is an endpoint e, and an end far from the endpoint d is an endpoint f. In specific disposing, the endpoint f is a connection point between the second notch structure 50 and the ground.

Still referring to FIG. 1, FIG. 1 shows a specific structure of an antenna provided in an embodiment of this application. The antenna includes a radiating element 10, a ground cable 30, a feeder 20, a first notch structure 40, and a second notch structure 50. When being applied to a mobile terminal, the antenna structure may be implemented by using a mechanical part of the mobile terminal. For example, a middle frame of the mobile terminal is used to form the radiating element 10, the first notch structure 40, and the second notch structure 50 of the antenna. In specific formation, the radiating element 10, the first notch structure 40, and the second notch structure 50 are formed by using side walls of the middle frame, and a support plate 100 between the side walls of the middle frame is used as the ground. For the first notch structure 40, the second notch structure 50, and the radiating element 10, the side walls of the middle frame are slit, to form several isolated metal segments, which are used as the first notch structure 40, the second notch structure 50, and the radiating element 10. In addition, there is a gap between the support plate 100 and each of the first notch structure 40, the second notch structure 50, and the radiating element 10. The gap is used as a clearance. Certainly, the antenna structure may alternatively be implemented in another manner. For example, the first notch structure 40, the second notch structure 50, and the radiating element 10 are all made of a flexible circuit board or other conductive materials.

In the structure shown in FIG. 1, the first notch structure 40 may be selectively connected to the ground. Specifically, the first notch structure 40 is grounded by using a second tuning device 60. With the disposed second tuning device 60, a length of a current path from the first notch structure 40 to the ground can be changed. In specific implementation, the second tuning device 60 includes a plurality of first parallel-connected branches 62 and one first selection switch 61, and one of the first selection switch 61 and the first parallel-connected branches 62 is connected to the ground, and the other is connected to the endpoint d of the first notch structure 40. As shown in FIG. 1, the plurality of first parallel-connected branches 62 are connected to the ground, and the first selection switch 61 is connected to the endpoint d. Certainly, a manner in which the plurality of first parallel-connected branches 62 are connected to the endpoint d, and the first selection switch 61 is connected to the ground may alternatively be used.

In some embodiments of this application, the antenna has a plurality of specified frequencies. The specified frequencies may be frequencies corresponding to the foregoing frequency bands such as B8, B20, and B28. In addition, the specified frequencies of the antenna are specified frequencies of the radiating element. When the antenna is at any one of the plurality of specified frequencies, a resonance frequency of a component formed when the first notch structure 40 is connected to the second tuning device 60 is a frequency that is lower by a first threshold than the specified frequency at which the antenna is. The first threshold is within 0 MHz to 300 MHz. In other words, the resonance frequency of the component formed when the first notch structure 40 is connected to the second tuning device 60 is lower by any frequency between 0 MHz and 300 MHz such as 50 MHz, 150 MHz, 250 MHz, or 300 MHz than the specified frequency at which the antenna is. When the second tuning device 60 is disposed, different parts and components are disposed on the plurality of first parallel-connected branches 62, so that when the first notch structure 40 is grounded by using one of the plurality of first parallel-connected branches 62, the current path length of the first notch structure 40 can be changed. In this way, the current path length of the first notch structure 40 can approximate a quarter of a wavelength corresponding to a resonance frequency of the radiating element 10. As a result, a current is attracted, and it is equivalent to increase a diameter of the antenna, thereby improving performance of the antenna. For example, the plurality of first parallel-connected branches 62 may be same or different branches, and any first branch may be a circuit in which an inductor and a capacitor are connected in series or in parallel, a wire, an inductor, or a capacitor.

Figure 2:
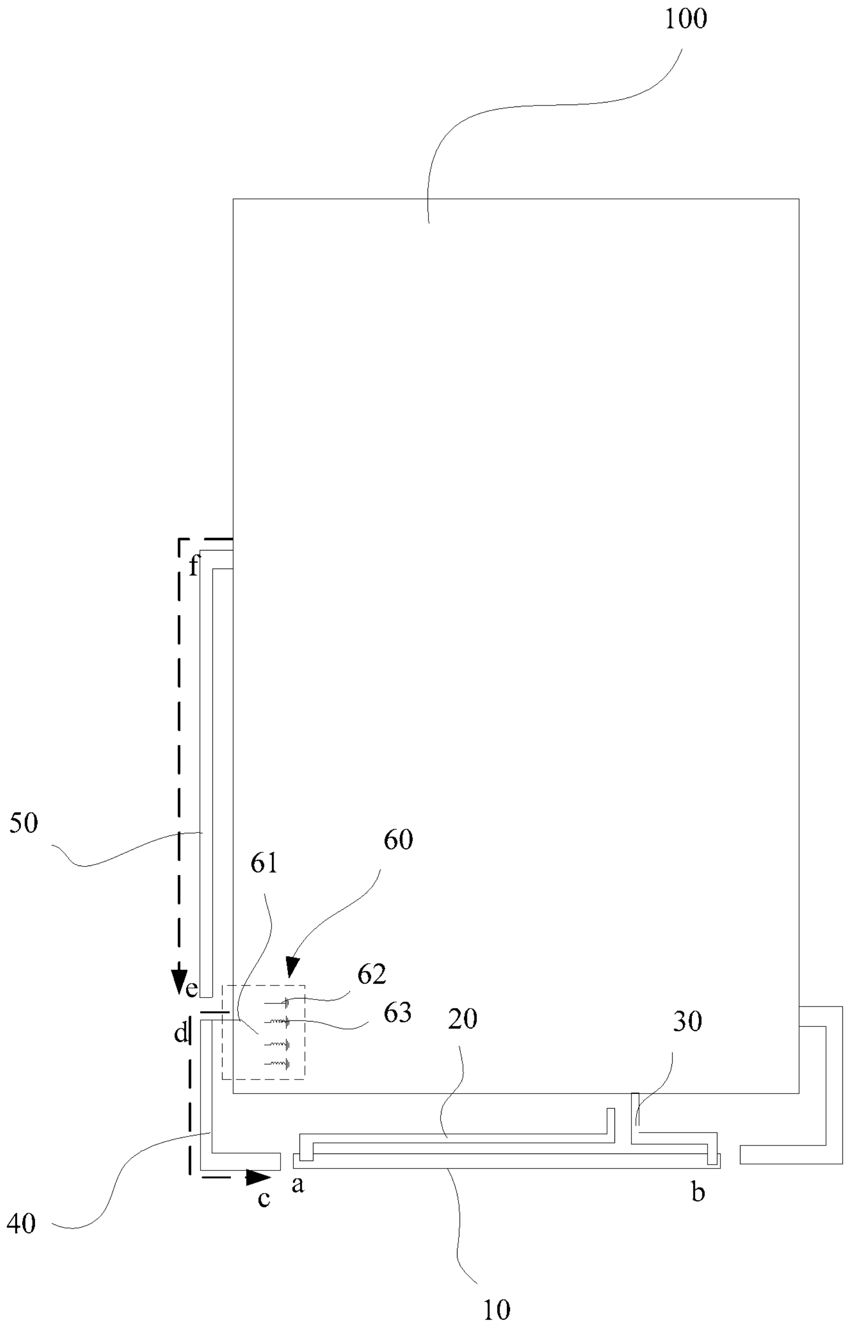
FIG. 2 is a schematic diagram of a current flow direction of the antenna structure shown in FIG. 1.

For example, an inductor 63 is disposed on one first branch 62, a capacitor is disposed on another first branch 62, or a different combination such as an inductor and a capacitor that are connected in series or in parallel is disposed on a first branch 62. In addition, an inductance value of the inductor 63 is determined by different frequency bands of the antenna. In this way, the antenna can obtain better low-frequency performance. FIG. 2 shows a current path of the antenna provided in [this] some embodiments of this application. It can be learned from FIG. 2 that when the first notch structure 40 is grounded, a current in the first notch structure 40 flows from a ground point to the endpoint d and then to the endpoint c, and a current in the second notch structure 50 flows from the endpoint f to the endpoint e.

In specific disposing, if neither the first notch structure 40 nor the second notch structure 50 includes a tuning device, a frequency of the second notch structure 50 is a frequency that is higher than a first specified frequency by the first threshold, and a frequency of the first notch structure 40 is a frequency that is lower than a second specified frequency by a second threshold. The first specified frequency is the highest frequency in the plurality of specified frequencies that the antenna has, and the second specified frequency is the lowest specified frequency in the plurality of specified frequencies. In a specific implementation solution, the first specified frequency is a frequency corresponding to a B8 frequency band, and the second specified frequency is a frequency corresponding to a B28 frequency band. In addition, a frequency of the first threshold is within 0 MHz to 300 MHz, and a frequency of the second threshold is within 0 MHz to 300 MHz. During specific commissioning, of the first notch structure 40 and the second notch structure 50, a resonance frequency of the second notch structure 50 is adjusted to a position slightly higher than the B8 frequency band (an adjustment range of 0 MHz to 300 MHz, provided that both FS performance and BHH performance are considered), and a resonance frequency of the first notch structure 40 is adjusted to a position slightly lower than the B28 frequency band (an adjustment range of 0 MHz to 300 MHz, provided that both FS performance and BHH performance are considered), thereby improving FS performance while improving BHH performance of all low frequencies. If the first notch structure 40 is grounded by using the second tuning device 60, the frequency of the first notch structure 40 may be adjusted by using the second tuning device 60, so that the adjustable resonance frequency of the first notch structure 40 is in a position slightly lower than the resonance frequency of the radiating element of the antenna (for example, an adjustment range of 0 MHz to 300 MHz, provided that both FS performance and BHH performance are considered), and the resonance frequency of the second notch structure 50 is in a position slightly higher than the B8 frequency band (an adjustment range of 0 MHz to 300 MHz, provided that both FS performance and BHH performance are considered).

For ease of understanding, the following compares efficiency of an antenna with a notch structure in the prior art with efficiency of the antenna with a notch structure provided in [this] embodiments of this application. Refer to Table 1 and Table 2. Table 1 shows the efficiency of the antenna with a notch structure in the prior art. Table 2 shows the efficiency of the antenna with a notch structure provided in an embodiment of this application.

For ease of understanding, the antenna shown in FIG. 1 in an embodiment of this application is compared with the antenna in the prior art, as shown in Table 1 and Table 2. Table 1 and Table 2 show antenna performance of a mobile terminal in the foregoing several detection states.

TABLE 1

| | B8 | | B20 | | B28 | |
|---|---|---|---|---|---|---|
| Prior Art | TX | RX | TX | RX | TX | RX |
| FS | −4.6 | −4.5 | −4.1 | −4.3 | −4.1 | −5.5 |
| BHHL | −12.8 | −12.1 | −12.8 | −12.6 | −12.5 | −14.1 |
| BHHR | −11.5 | −12 | −12.7 | −12 | −13.1 | −14.7 |

TABLE 2

| Antenna shown in | B8 (28 nH) | | B8 (40 nH) | | B20 (40 nH) | | B28 (40 nH) | |
|---|---|---|---|---|---|---|---|---|
| FIG. 1 | TX | RX | TX | RX | TX | RX | TX | RX |
| FS | −3.3 | −3.5 | −3.7 | −3.8 | −3.2 | −3.4 | −3.3 | −2.9 |
| BHHL | −12.9 | −12.5 | −13.1 | −12.8 | −13.1 | −13.3 | −12.9 | −13.2 |
| BHHR | −11.6 | −11.6 | −11.6 | −11.7 | −12.3 | −12.3 | −12.6 | −13.7 |

It can be learned through comparison of Table 1 and Table 2 that by using the first notch structure 40 and the second notch structure 50, the antenna provided in some embodiments of this application can have a gain of 0.5 dB in free space, and BHH performance of the antenna can have a gain of 1 dB.

When the first notch structure 40 and the second notch structure 50 are disposed, not only limited to one manner shown in FIG. 1, a manner shown in FIG. 3 may alternatively be used. In this manner, the first notch structure 40 is connected to the second notch structure 50, so that the first notch structure 40 and the second notch structure 50 are connected to form a whole. In addition, in specific connecting, in a specific implementation solution, the first notch structure 40 and the second notch structure 50 are connected by using a first tuning device 70. The first tuning device 70 is configured to change a current path length of the first notch structure 40 and the second notch structure 50 that are connected. In specific disposing, the first tuning device 70 includes a plurality of second parallel-connected branches 73 and one second selection switch 71, and in specific connecting, the second parallel-connected branches 73 and the second selection switch 71 are connected to the endpoint d of the first notch structure 40 and the endpoint e of the second notch structure 50, but this is not limited in specific connecting. As shown in FIG. 3, the second selection switch 71 is connected to the endpoint d of the first notch structure 40, and the second parallel-connected branches 73 are connected to the endpoint e of the second notch structure 50. Certainly, a manner in which the second selection switch 71 is connected to the endpoint e of the second notch structure 50, and the second parallel-connected branches 73 are connected to the endpoint d of the first notch structure 40 may alternatively be used. In addition, regardless of which of the foregoing manners is used, it can be implemented that the second notch structure 50 selects, by using the second selection switch 71, one of the plurality of second parallel-connected branches 73 to connect to the second notch structure 50. When the structure is used, in a corresponding antenna feature, when the antenna is at any one of a plurality of specified frequencies, a resonance frequency of a component formed when the first notch structure 40 is connected to the second notch structure 50 by using the first tuning device 70 is a frequency that is lower by a first threshold than the specified frequency (a resonance frequency of the radiating element 10) at which the antenna is. The first threshold is within 0 MHz to 300 MHz. For example, when the antenna operates at the B8 frequency band, the resonance frequency of the corresponding component formed after the first notch structure 40 and the second notch structure 50 are connected is a frequency that is lower than a frequency of the B8 frequency band by 0 MHz to 300 MHz.

When the first tuning device 70 is disposed, different parts and components may be disposed on the plurality of second parallel-connected branches 73, the plurality of second parallel-connected branches 73 may be same or different branches, and any second branch may be a circuit in which an inductor 72 and a capacitor 74 are connected in series or in parallel, a wire, the inductor 72, or the capacitor 74. For example, the inductor 72 is disposed on one second branch 73, the capacitor 74 is disposed on another second branch 73, or a different combination such as the inductor 72 and the capacitor 74 that are connected in series or in parallel is disposed on a second branch 73. In specific disposing, capacitance values of the capacitors 74 disposed on different second branches 73 are different, and inductance values of the inductors 72 disposed on different second branches 73 are also different, so that when the first notch structure 40 and the second electric wave structure are connected, a current path length that is of the first notch structure 40 and the second notch structure 50 can be changed by using the disposed capacitor 74 and inductor 72. In this way, the current path length that is of the first notch structure 40 and the second notch structure 50 can approximate a quarter of a wavelength corresponding to a resonance frequency of the radiating element. As a result, a current is attracted, thereby improving performance of the antenna. In addition, in the foregoing manner, when the antenna operates at a high frequency band, the first notch structure 40 and the ground may select different capacitors 74 or small-inductance inductors for connection; and when the antenna operates at a low frequency band, the first notch structure 40 and the second notch structure 50 may select different inductors 72 or large-capacitance capacitors for connection, or a different inductor 72 is selected between the first notch structure 40 and the ground.

Figure 4:
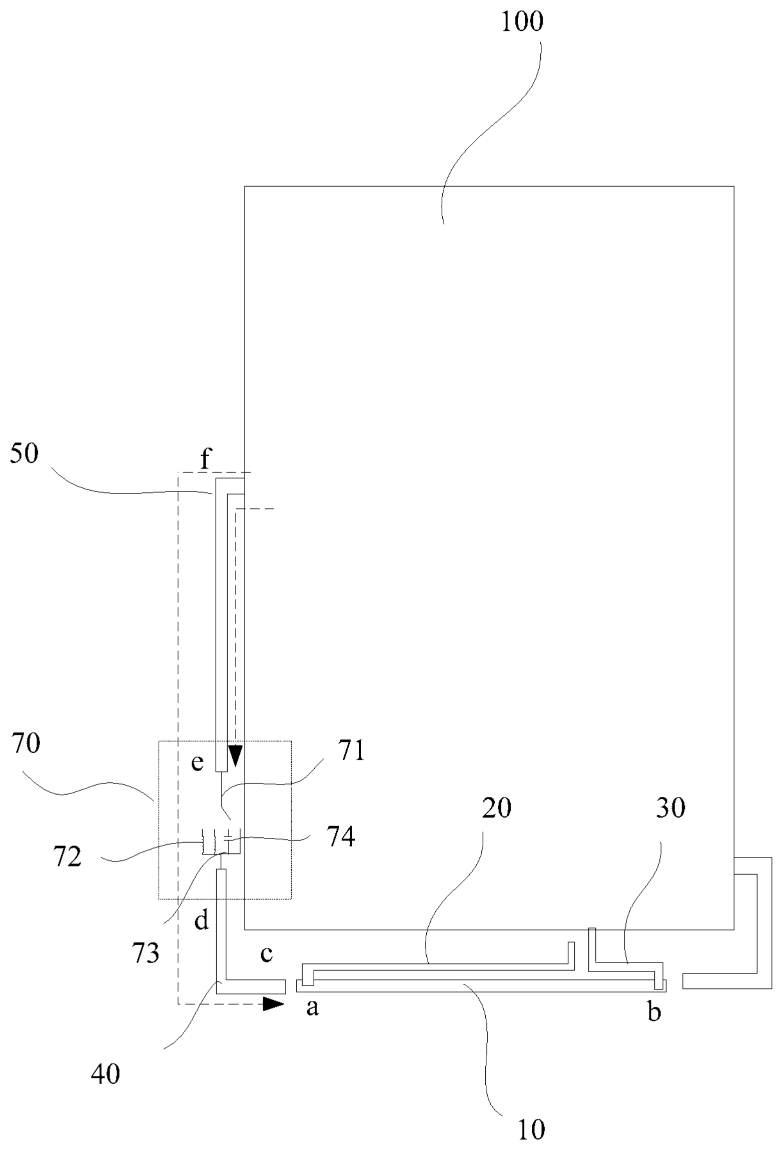
FIG. 4 is a schematic diagram of a current flow direction of the antenna structure shown in FIG. 3.

FIG. 4 shows a current path when the first notch structure 40 and the second notch structure 50 are connected in the manner shown in FIG. 3. As shown in FIG. 4, a current flows from the endpoint f of the second notch structure 50, through the second notch structure 50, the first tuning device 70, and the first notch structure 40 sequentially, and to the endpoint c of the first notch structure 40.

Refer to Table 1 and Table 3. Table 3 shows efficiency of the antenna shown in FIG. 4.

TABLE 3

| Antenna shown in | B8 | | B20 | | B28 | |
|---|---|---|---|---|---|---|
| FIG. 3 | TX | RX | TX | RX | TX | RX |
| FS | −4 | −4 | −3.6 | −3.3 | −3.6 | −3.8 |
| BHHL | −12.2 | −11.8 | −10.9 | −11.6 | −12.3 | −11.6 |
| BHHR | −11.6 | −11.7 | −10.5 | −10.4 | −9.6 | −9.6 |

It can be learned through comparison of Table 1 and Table 3 that a hand holding state is determined by using a hand phantom sensor disposed on a mobile terminal, and in the free space state, the second selection switch 71 is disconnected, so that a resonance frequency of the first notch structure 40 is around 1.1 GHz, improving efficiency of the B8 frequency band to some extent (0.4 dB); and in the BHH state, the second selection switch 71 is connected to different parts and components in series, so that a resonance frequency of the first notch structure 40 is in an optimal position of the frequency band.

Figure 5:
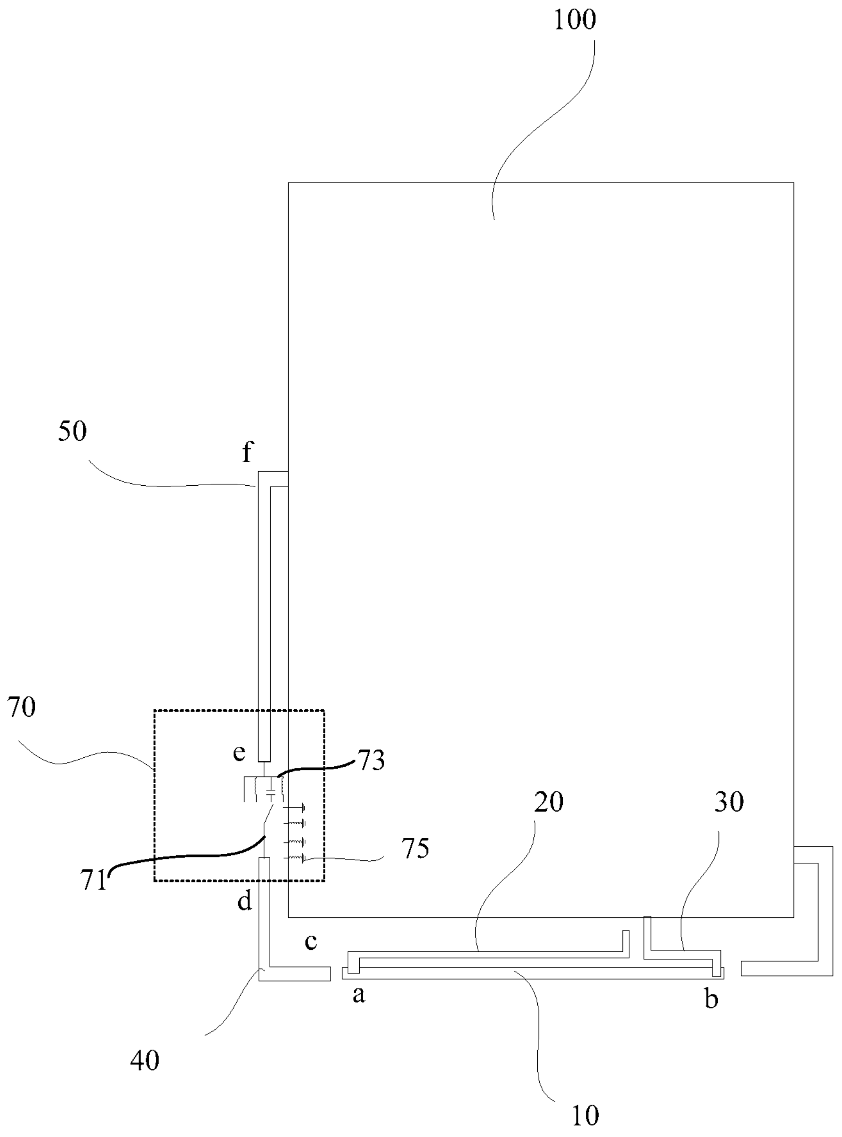
FIG. 5 is a schematic diagram of another antenna structure according to an embodiment of this application.

In the foregoing structures in FIG. 1 and FIG. 3, a solution of the first notch structure 40 being connected to the ground and a solution of the first notch structure 40 being connected to the second notch structure 50 are described. Besides the foregoing solutions, the antenna provided in some embodiments of this application may further use a solution in which the first notch structure 40 performs a connection switchover between the second notch structure 50 and the ground. Specifically, FIG. 5 shows another antenna structure provided in an embodiment of this application. In the structure, the first notch structure 40 may select, by using the first tuning device 80, to connect to the second notch structure 50 or to connect to the ground, so as to implement that the first notch structure 40 switches between the second notch structure 50 and the ground, and implement that a current path length of the first notch structure 40 and that of the second notch structure 50 are changed. In this way, the current path length of the first notch structure 40 and that of the second notch structure 50 can approximate a quarter of a wavelength corresponding to a resonance frequency of the radiating element of the antenna. As a result, a current is attracted, thereby improving performance of the antenna.

When the first tuning device 70 is disposed, the first tuning device 70 includes the plurality of second parallel-connected branches 73, a plurality of third parallel-connected branches 75, and the second selection switch 71, where the second selection switch 71 is connected to the first notch structure 40. In specific connecting, the second selection switch 71 is connected to the endpoint d of the first notch structure 40. The plurality of second parallel-connected branches 73 are connected to the second notch structure 50 (endpoint e), and the plurality of third parallel-connected branches 75 are connected to the ground. In addition, the first notch structure 40 selects, by using the third selection switch, one of the plurality of second parallel-connected branches 73 or one of the plurality of third parallel-connected branches 75 for connection.

Figure 6:
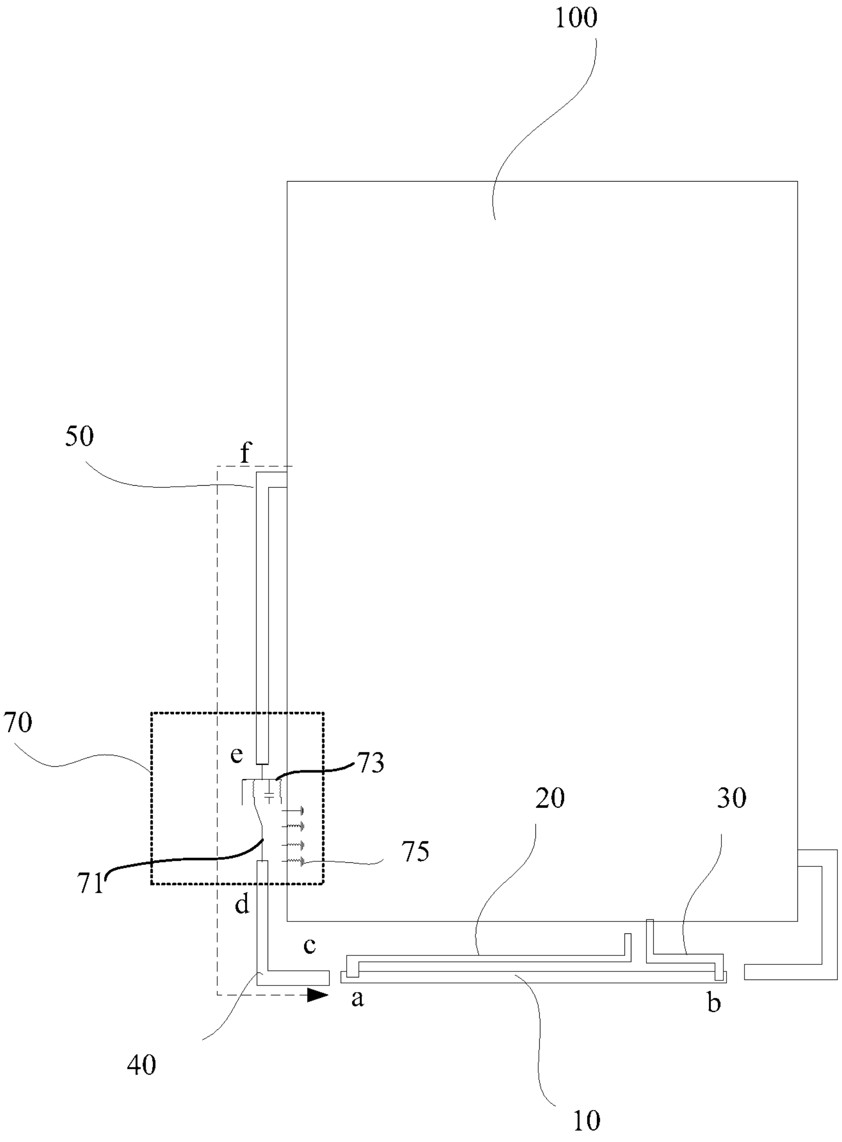
FIG. 6 is a schematic diagram of a current flow direction when a first notch structure and a second notch structure that are of the antenna structure shown in FIG. 5 are connected.

When the plurality of second branches 73 are disposed, the plurality of second parallel-connected branches 73 may be same or different branches, and any second branch 73 may be a circuit in which an inductor and a capacitor are connected in series or in parallel, a wire, an inductor, or a capacitor. For example, when only capacitors are included, capacitance values of capacitors disposed on different second branches 73 are different; and when only inductors are included, inductance values of inductors disposed on different second branches 73 are also different. Alternatively, for example, an inductor is disposed on one second branch 73, a capacitor is disposed on another second branch 73, or a different combination such as an inductor and a capacitor that are connected in series or in parallel is disposed on a second branch 73. In this way, when the first notch structure 40 and the second notch structure 50 are connected, the current path length can be changed by using the disposed capacitor and inductor. In addition, in the foregoing manner, when the antenna operates at a high frequency band, the first notch structure 40 and the ground may select different capacitors or small-inductance inductors for connection; and when the antenna operates at a low frequency band, the first notch structure 40 and the second notch structure 50 may select different inductors or large-capacitance capacitors for connection, or a different inductor is selected between the first notch structure 40 and the ground. FIG. 6 shows a current path when the first notch structure 40 is connected to the second notch structure 50 by selecting one second branch 73 by using the second selection switch 71. As shown in FIG. 6, a current flows from the endpoint f of the second notch structure 50, through the second notch structure 50, the first tuning device 70, and the first notch structure 40 sequentially, and to the endpoint c of the first notch structure 40.

Figure 7:
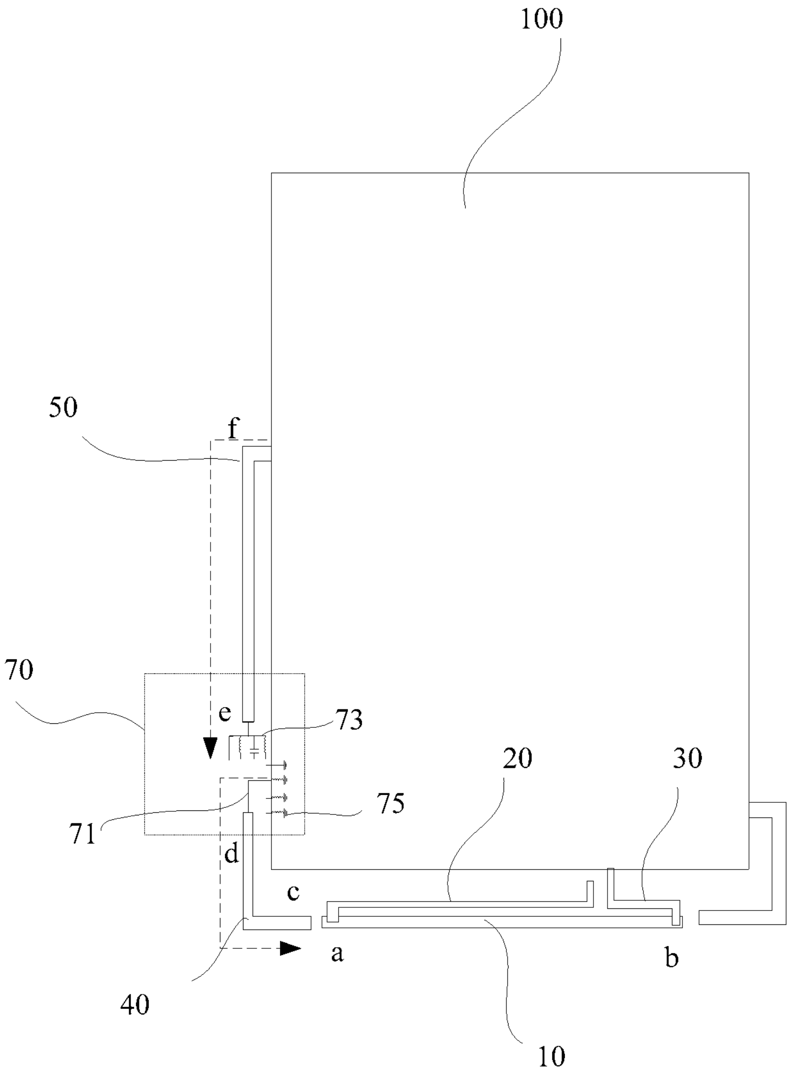
FIG. 7 is a schematic diagram of a current flow direction when a first notch structure of the antenna structure shown in FIG. 5 is grounded.

Different parts and components are disposed on the plurality of third parallel-connected branches 75, the plurality of third parallel-connected branches 75 may be same or different branches, and any third branch 75 may be a circuit in which an inductor and a capacitor are connected in series or in parallel, a wire, an inductor, or a capacitor. For example, when only capacitors are included, capacitance values of capacitors disposed on different third branches 75 are different; and when only inductors are included, inductance values of inductors disposed on different third branches 75 are also different. Alternatively, for example, an inductor is disposed on one third branch 75, a capacitor is disposed on another third branch 75, or a different combination such as an inductor and a capacitor that are connected in series or in parallel is disposed on a third branch 75. In this way, when the first notch structure 40 is grounded by using one of the plurality of third parallel-connected branches 75, a current path length of the first notch structure 40 can be changed. FIG. 7 shows current paths when the first notch structure 40 is connected to the ground by selecting one third branch 75 by using the second selection switch 71. It can be learned from FIG. 7 that when the first notch structure 40 is grounded, a current in the first notch structure 40 flows from a ground point to the endpoint d and then to the endpoint c, and a current in the second notch structure 50 flows from the endpoint f to the endpoint e. In addition, when the first notch structure 40 and the second notch structure 50 are used, free space performance and beside head and hand performance of the antenna can be effectively improved.

TABLE 4

| Antenna shown in | B8 | | B20 | | B28 | |
|---|---|---|---|---|---|---|
| FIG. 5 | TX | RX | TX | RX | TX | RX |
| FS | −3.9 | −4 | −3.2 | −3.3 | −3.2 | −3.0 |
| BHHL | −11.1 | −11.4 | −11.1 | −11.6 | −12.1 | −11.2 |
| BHHR | −11.2 | −11.7 | −10.5 | −10.1 | −9.1 | −9.9 |

It can be learned through comparison of Table 3 and Table 4 that when the first tuning device 70 is used to connect the first notch structure 40 and the second notch structure 50, compared with the antenna shown in FIG. 3, FS performance of the antenna shown in FIG. 5 is improved, that is, the antenna shown in FIG. 5 has a gain of 0.5 dB in the B28 frequency band and a gain of 0.4 dB in TX of the B20 frequency band.

Figure 8:
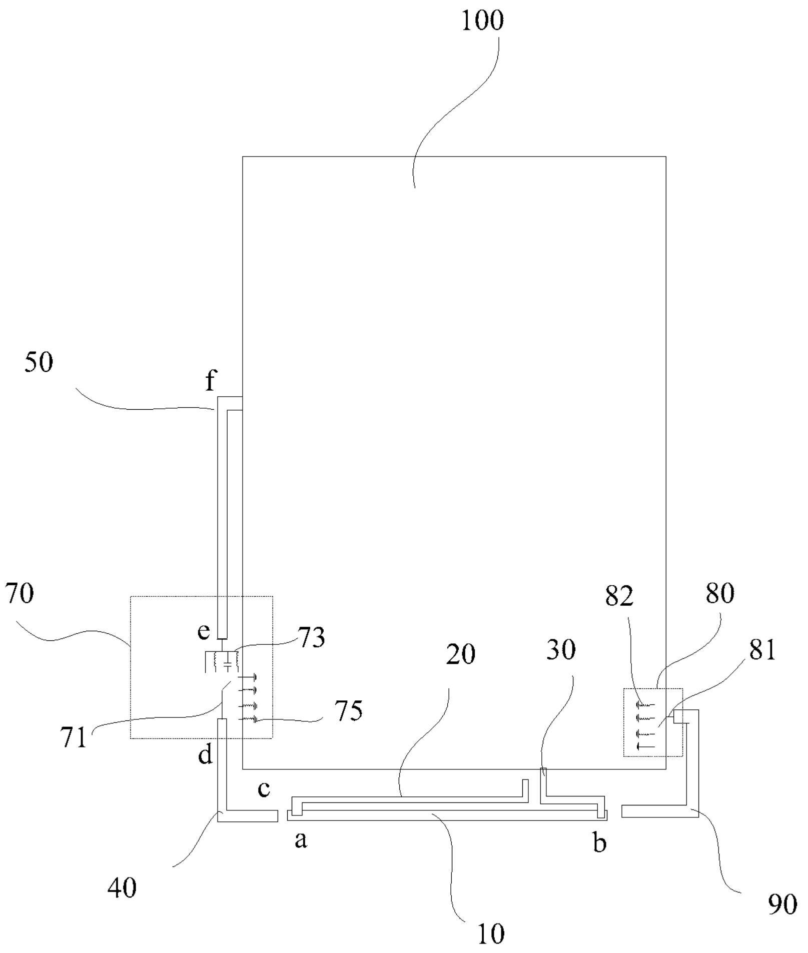
FIG. 8 is a schematic diagram of another antenna structure according to an embodiment of this application.

FIG. 8 shows another antenna structure provided in an embodiment of this application. The antenna includes the first notch structure 40 and the second notch structure 50. A connection manner between the first notch structure 40 and the ground and a connection manner between the second notch structure 50 and the ground may be the manner shown in FIG. 1, the connection manner shown in FIG. 3, or the connection manner shown in FIG. 5. The first notch structure 40 and the second notch structure 50 that are shown in FIG. 8 are connected in a manner shown in FIG. 8. In addition, the antenna further includes a third notch structure 90.

The third notch structure 90 is located at an end that is of the radiating element 10 and that is far from the first notch structure 40. As shown in FIG. 8, the first notch structure 40 is located on the side of the endpoint a of the radiating element 10, and the third notch structure 90 is located on the side of the endpoint b of the radiating element 10. In addition, an end that is of the third notch structure 90 and that is far from the radiating element 10 is grounded. In specific grounding, the third notch structure 90 is grounded by using a third tuning device 80. The third tuning device 80 includes a plurality of fourth parallel-connected branches 82 and a third selection switch 81, and the third notch structure selects, by using the third selection switch 81, one of the plurality of fourth parallel-connected branches 82 for grounding. When the structure is used, in a corresponding antenna feature, when the antenna is at any one of a plurality of specified frequencies, a resonance frequency of a component formed when the third notch structure 90 is connected to the ground by using the first tuning device 80 is a frequency that is lower by a first threshold than the specified frequency (a resonance frequency of the radiating element 10) at which the antenna is. The first threshold is within 0 MHz to 300 MHz. For example, when the antenna operates at the B8 frequency band, the resonance frequency of the corresponding component formed after the third notch structure 90 and the second notch structure 50 are connected is a frequency that is lower than a frequency of the B8 frequency band by 0 MHz to 300 MHz.

Figure 9:
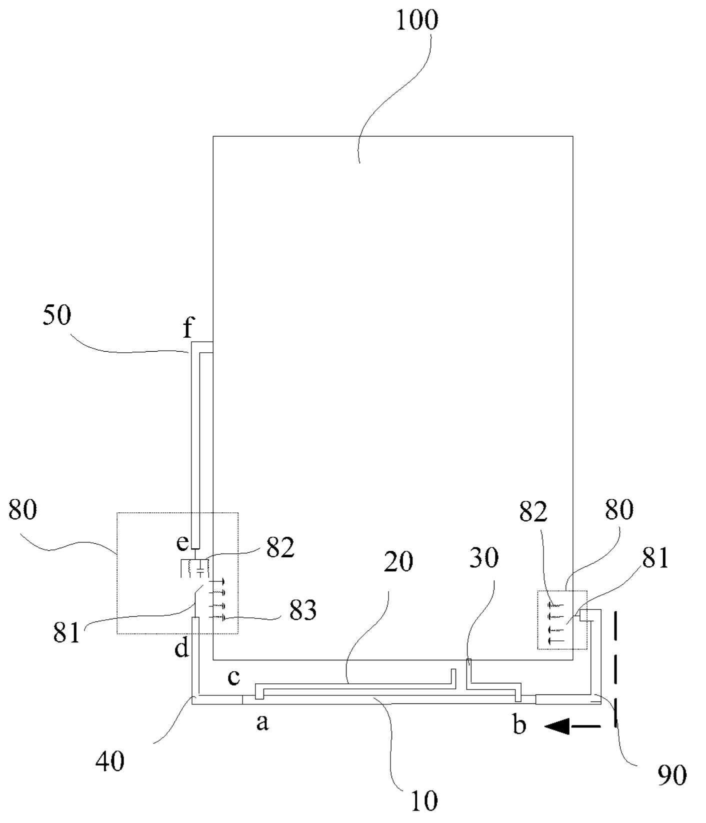
FIG. 9 is a schematic diagram of a current flow direction of the antenna structure shown in FIG. 8.

When the third tuning device 80 is disposed, the plurality of fourth parallel-connected branches 82 may be same or different branches, and any fourth branch 82 may be a circuit in which an inductor and a capacitor are connected in series or in parallel, a wire, an inductor, or a capacitor. For example, when only capacitors are included, capacitance values of capacitors disposed on different fourth branches 82 are different; and when only inductors are included, inductance values of inductors disposed on different fourth branches 82 are also different. Alternatively, for example, an inductor is disposed on one fourth branch 82, a capacitor is disposed on another fourth branch 82, or a different combination such as an inductor and a capacitor that are connected in series or in parallel is disposed on a fourth branch 82. In this way, when the third notch structure 90 is grounded by using one of the plurality of fourth parallel-connected branches 82, a current path length of the third notch structure 90 can be changed, and the current path length of the third notch structure 90 can approximate a quarter of a wavelength corresponding to a resonance frequency of the radiating element of the antenna. As a result, a current is attracted, thereby improving performance of the antenna. FIG. 9 shows a current path of the antenna provided in an embodiment of this application. It can be learned from FIG. 9 that when the third notch structure 90 is grounded, a current in the third notch structure 90 flows from a ground point to an endpoint that is of the third notch structure 90 and that is near the radiating element 10. For efficiency of the antenna, refer to Table 4 and Table 5.

TABLE 5

| Antenna shown in | B8 | | B20 | | B28 | |
|---|---|---|---|---|---|---|
| FIG. 8 | TX | RX | TX | RX | TX | RX |
| FS | −3.8 | −3.8 | −3.1 | −3.0 | −2.6 | −2.8 |
| BHHL | −11.3 | −11.5 | −11.3 | −11.8 | −12.0 | −11.1 |
| BHHR | −11.3 | −11.7 | −10.5 | −10.3 | −9.5 | −9.9 |

With reference to Table 4 and Table 5, the antenna shown in FIG. 8 has the fixed third notch structure 90 added to a right side of the antenna shown in FIG. 5, thereby improving FS performance of the antenna. In addition, there is a gain of 0.5 dB in the B28 frequency band, a gain of 0.2 dB in the B20 frequency band, and a gain of 0.2 dB in the B8 frequency band. Performance of the antenna is improved as a whole.

It can be learned from the foregoing description that in the antenna provided in [this] embodiments of this application, by changing the connection manner between the disposed first notch structure 40 and the ground and the connection manner between the disposed second notch structure 50 and the ground, a current path length of an entire notch structure can be changed, and a current path length of a disposed notch structure can approximate a quarter of the wavelength corresponding to the resonance frequency of the radiating element of the antenna, so that a current can be absorbed to the notch structure, to improve performance of the antenna.

Figure 10:
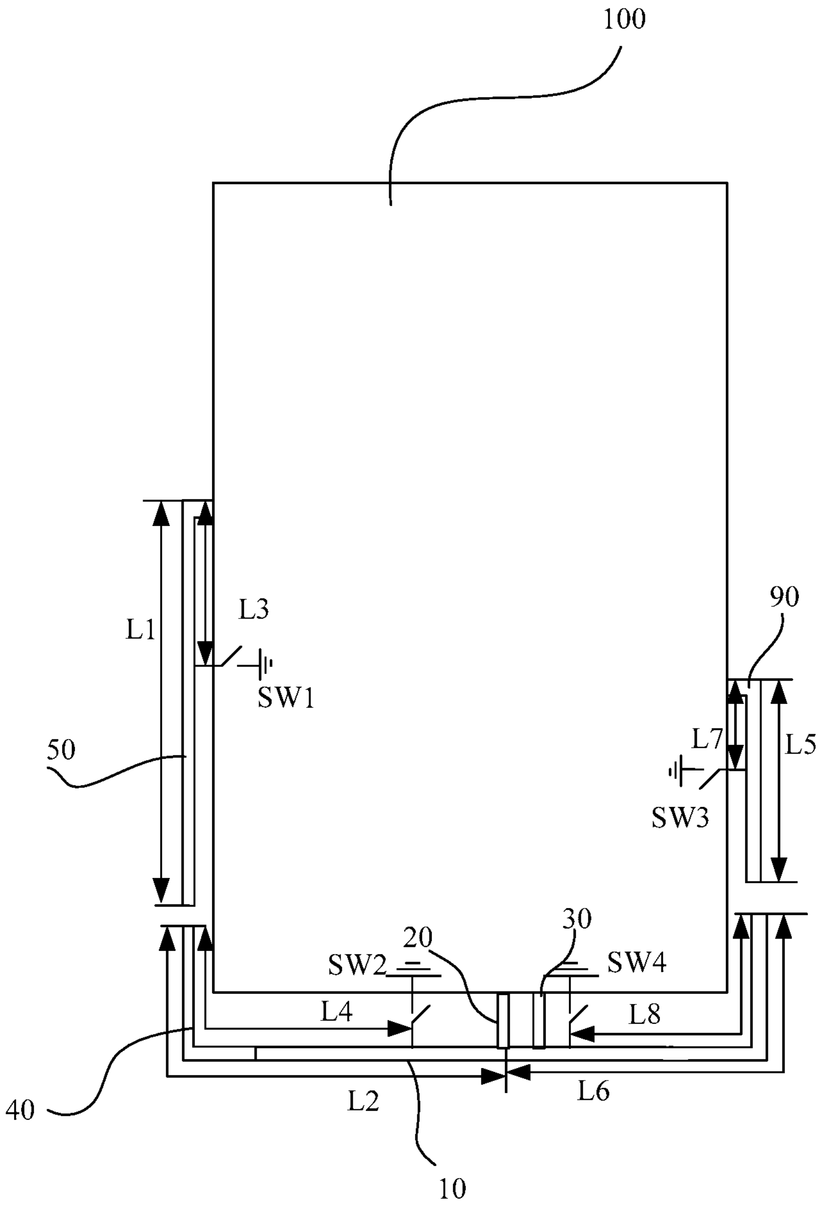
FIG. 10 is a schematic diagram of another antenna structure according to an embodiment of this application.
Figure 11:
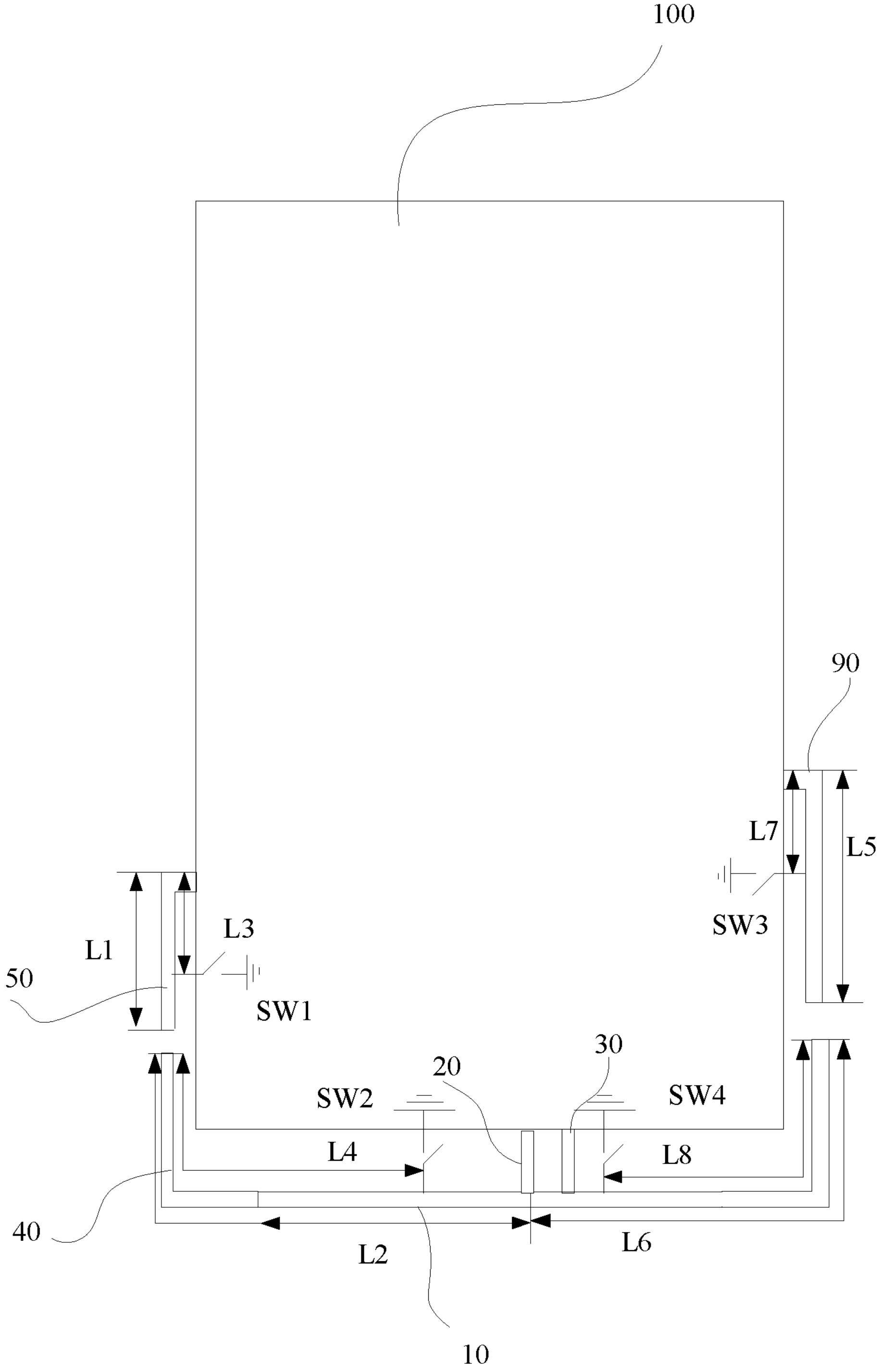
FIG. 11 is a schematic diagram of another antenna structure according to an embodiment of this application.

Besides the solutions described in the foregoing embodiments, in the multi-band antenna provided in embodiments of this application, communication performance of the antenna can be alternatively improved in the following manner. For a low frequency, as shown in FIG. 10, in specific disposing, the first notch structure 40 and the radiating element 10 are an integrated structure. The first notch structure 40 is connected to the second notch structure 50 in a coupling manner, and the second notch structure 50 and the radiating element 11 meet: a difference between L1 and L2 approximates a third specified threshold. L1 is a current path length of the second notch structure 50; and L2 is a length of a current path from a connection point between the feeder 20 and the radiating element 10 to a first end of the first notch structure 40. The first end of the first notch structure 40 is an end that is of the first notch structure 40 and that is near the second notch structure 50. In addition, in specific disposing, as shown in FIG. 10, L1 is approximately equal to L2, or the second notch structure 50 may alternatively be disposed in a manner, shown in FIG. 11, in which L1 is approximately equal to ⅓ of L2. In this case, an effective length of a left slot is comparable to ⅓ of an effective length of a main resonance branch. When a left slit is held, an in-band resonance frequency doubles a frequency of a loop mode formed from a feedpoint to a left slit position, instead of half (original value) of the frequency. When the foregoing structure is used and when the antenna is operating, a flow direction of a current in the second notch structure 50 is opposite to a flow direction of a current in the first notch structure 40 and the radiating element 10. In this case, when a mobile terminal is held, communication performance of the antenna can be improved. In addition, to perform a switchover between a high frequency and a low frequency, a first transfer switch SW1 is disposed on the second notch structure 50, and a second transfer switch SW2 is disposed on the radiating element 10; and the second notch structure 50 and the radiating element 10 further meet: a difference between L3 and L4 approximates a fourth specified threshold, where L3 is a length of a current path from a connection point between the first transfer switch SW1 and the second notch structure 50 to an end that is of the second notch structure 50 and that is far from the radiating element 10; and L4 is a length of a current path from the second transfer switch SW2 to the first end of the first notch structure 40. With the disposed first transfer switch SW1 and second transfer switch SW2, a switchover between a high frequency and a low frequency is implemented.

Similarly, for a high frequency, as shown in FIG. 10, the third notch structure 90 is located on a side that is of the radiating element 10 and that is far from the second notch structure 50, the third notch structure 90 is connected to the radiating element 10 in a coupling manner, and an end that is of the third notch structure 90 and that is far from the radiating element 10 is grounded. A difference between L5 and L6 approximates the third specified threshold, where L5 is a current path length of the third notch structure 90; and L6 is a length of a current path from a connection point between the feeder 20 and the radiating element 10 to a second end of the radiating element 10. The second end of the radiating element 10 is an end that is of the radiating element 10 and that is near the third notch structure 90. With the disposed third notch structure 90, communication performance of the antenna is improved.

In addition, a third transfer switch SW3 is disposed on the third notch structure 90, and a fourth transfer switch SW4 is disposed on the radiating element 10. The third notch structure 90 and the radiating element 10 further meet: a difference between L7 and L8 approximates the fourth specified threshold. L7 is a length of a current path from a connection point between the third transfer switch SW3 and the third notch structure 90 to an end that is of the third notch structure 90 and that is far from the radiating element 10. L8 is a length of a current path from the fourth transfer switch SW4 to the second end of the radiating element 10. With the disposed third transfer switch SW3 and fourth transfer switch SW4, a switchover between a high frequency and a low frequency is implemented.

Figure 12A:
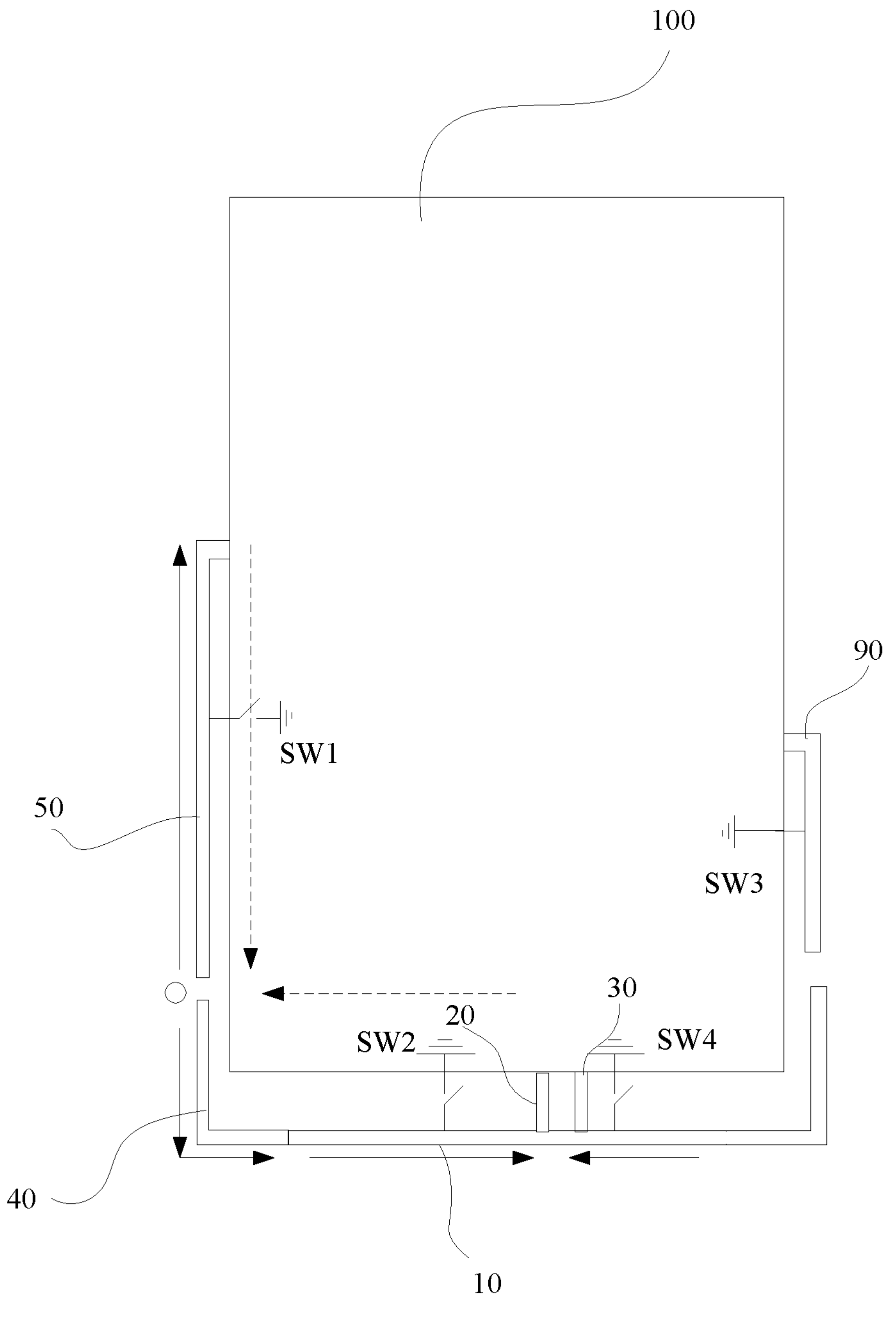
FIG. 12*a* is a schematic diagram of a current flow in an antenna shown in FIG. 10.
Figure 12B:
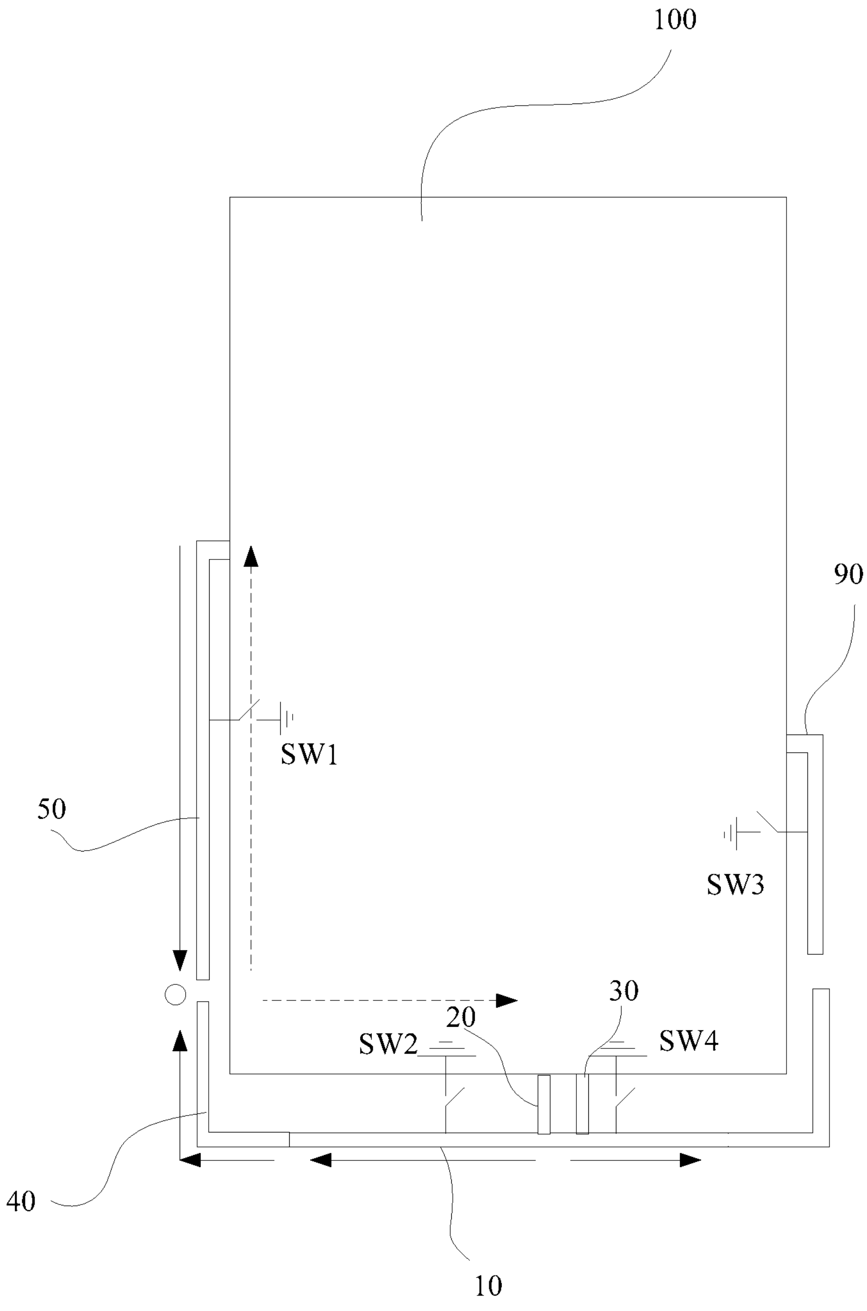
FIG. 12*b* is a schematic diagram of a current flow in an antenna shown in FIG. 10.

For ease of understanding of the multi-band antenna, the antenna structure shown in FIG. 10 is used as an example for simulation. In the structure shown in FIG. 10, L1 is approximately equal to L2, the first transfer switch SW1 and the third transfer switch SW3 are disposed, and L3 is approximately equal to L4. When SW1 is short-circuited and SW3 is disconnected, the multi-band antenna is in a main state (FS+BHHL) of a low frequency B5. In this case, when the left slit is held, there is still a malicious death grip. As shown in FIG. 12*a*, when SW1 is disconnected and SW3 is short-circuited (or open), the multi-band antenna is in a MAS state (BHHR) of the low frequency B5. In this case, when the left slit is held (or slits on both sides are held tight), the antenna still has efficiency of about −10, and it may be considered that there is no malicious death grip. In the low-frequency MAS state, a main resonator and an effective resonator of the second notch structure 50 basically have a same length (the two resonators basically operate on a same frequency). In FS, currents in two low-frequency branches are opposite, and there is a dent in radiation efficiency. In a current flow shown in FIG. 12*a*, as indicated by solid-line arrows, a current flows from an end that is of the second notch structure 50 and that is far from the first notch structure 40 to the first notch structure 40, and a current flowing from the feeder 20 flows to the first notch structure 40 along the radiating element 10. As indicated by dashed-line arrows, a current in a circuit board flows from a grounded end of the second notch structure 50 to a direction close to the first notch structure 40 and flows from an end of the feeder 20 to the direction close to the first notch structure 40. As shown in FIG. 12*b*, when the left slit is held by a right hand, the main resonator deviates, but there is one resonator remaining in the band (sideband efficiency of about −10). Current distribution of the resonator is indicated by solid-line arrows and dashed-line arrows in FIG. 12*b*. As indicated by solid-line arrows, a current flows from a grounded end of the second notch structure 50 to an end that is of the second notch structure 50 and that is near the first notch structure 40, and a current flowing from the feeder 20 flows to the first notch structure 40. As indicated by dashed-line arrows, a flow direction of a current in the ground is as follows: flows from an end that is of the second notch structure 50 and that is near the first notch structure 40 to a location at which the second notch structure 50 is connected to the ground, and flows to a direction of the feeder 20. Based on the current distribution, it is a loop mode formed from the feedpoint to the second notch structure 50 (a location of the resonator is consistent with a location of the original radiation efficiency dent). During simulation, with the disposed first notch structure 40 and the second notch structure 50, beside head and hand right efficiency of the low frequency B5 increases from original −18 dBi to sideband −10 dBi, and a low-frequency malicious death grip problem existing in a both-side-slit ID state can be resolved, and beside head and hand indexes of a lower part of an antenna may be met.

It should be understood that the antenna provided in the foregoing embodiments is not only applicable to a metal bezel structure that is of a mobile terminal and that has slits on both sides, but also applicable to different metal bezel structures that are of mobile terminals and that have a U-shaped slit on both sides, a racetrack slit, a straight slit, or the like.

In addition, this application further provides a mobile terminal. The mobile terminal may be a mobile phone, a tablet computer, a smartwatch, or the like. In addition, the mobile terminal includes the antenna according to any one of the foregoing embodiments. For the antenna, changing a connection manner between a disposed first notch structure 40 and the ground and a connection manner between a disposed second notch structure 50 and the ground, a current path length of an entire notch structure can be changed, and a current path length of a disposed notch structure can approximate a quarter of a wavelength corresponding to a resonance frequency of a radiating element of the antenna, so that a current can be absorbed to the notch structure, to improve performance of the antenna.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A mobile terminal, comprising an antenna, wherein the antenna comprises a feeder and a radiating element connected to the feeder, and further comprises:

a first notch structure, wherein the first notch structure is located on a side of the radiating element and coupled to the radiating element, wherein the first notch structure is not connected to the radiating element and there is a gap between the radiating element and the first notch structure; and a second notch structure, wherein the second notch structure is located on a far side of the first notch structure from the radiating element, and a far end of the second notch structure from the radiating element is grounded, wherein the first notch structure is selectively connected to the ground or to the second notch structure.

2. The mobile terminal according to claim 1, wherein the antenna has a plurality of specified frequencies, the highest of the plurality of specified frequencies is a first specified frequency, the lowest of the plurality of specified frequencies is a second specified frequency, a frequency of the second notch structure is higher than the first specified frequency by a first threshold, and a frequency of the first notch structure is lower than the second specified frequency by a second threshold.

3. The mobile terminal according to claim 2, wherein the first specified frequency is a frequency corresponding to a B8 frequency band, and the second specified frequency is a frequency corresponding to a B28 frequency band.

4. The mobile terminal according to claim 2, wherein the first threshold is between 0 MHz to 300 MHz, and the second threshold is between 0 MHz to 300 MHz.

5. The mobile terminal according to claim 1, when the first notch structure is connected to the second notch structure via a first tuning device.

6. The mobile terminal according to claim 5, further comprising a second tuning device, wherein the second tuning device comprises a plurality of first parallel-connected branches and a first selection switch, and the plurality of first parallel-connected branches may be same or different branches, wherein the first notch structure selects, by using the first selection switch, one of the plurality of first parallel-connected branches for grounding.

7. The mobile terminal according to claim 6, wherein the antenna has a plurality of specified frequencies, and when the antenna is set at one of the plurality of specified frequencies, a resonance frequency of a component formed when the first notch structure is connected to the second tuning device is lower by a first threshold than the specified frequency at which the antenna is set.

8. The mobile terminal according to claim 5, wherein the first tuning device comprises a plurality of second parallel-connected branches and a second selection switch, and the plurality of second parallel-connected branches may be same or different branches, wherein the second notch structure selects, by using the second selection switch, one of the plurality of second parallel-connected branches to connect to the second notch structure.

9. The mobile terminal according to claim 8, wherein the antenna has a plurality of specified frequencies, and when the antenna is set at one of the plurality of specified frequencies, a resonance frequency of a component formed when the first notch structure is connected to the second notch structure by using the first tuning device is lower by a first threshold than the specified frequency at which the antenna is set.

10. The mobile terminal according to claim 8, wherein the first tuning device further comprises a plurality of third parallel-connected branches that are connected to the ground, and the plurality of third parallel-connected branches may be same or different branches, wherein the first notch structure selects, by using the second selection switch, one of the plurality of third parallel-connected branches for connection.

11. The mobile terminal according to claim 10, wherein the antenna has a plurality of specified frequencies, and when the antenna is set at one of the plurality of specified frequencies, a resonance frequency of a component formed when the first notch structure is connected to the third branch is lower by a first threshold than the specified frequency at which the antenna is set.

12. The mobile terminal according to claim 1, wherein the antenna further comprises a third notch structure, the third notch structure is located at a far end of the radiating element far from the first notch structure, and a far end of the third notch structure from the radiating element is grounded.

13. The mobile terminal according to claim 12, further comprising a third tuning device, wherein the third tuning device comprises a plurality of fourth parallel-connected branches and a third selection switch, and the plurality of fourth parallel-connected branches may be same or different branches, wherein the third notch structure selects, by using the third selection switch, one of the plurality of fourth parallel-connected branches for grounding.

14. The mobile terminal according to claim 13, wherein the antenna has a plurality of specified frequencies, and when the antenna is set at one of the plurality of specified frequencies, a resonance frequency of a component formed when the first notch structure is connected to the third tuning device is lower by a first threshold than the specified frequency at which the antenna is set.

15. The mobile terminal according to claim 1, wherein the first notch structure and the radiating element are an integrated structure; and a difference between L1 and L2 approximates a third specified threshold, wherein L1 is a current path length of the second notch structure; and L2 is a length of a current path from a connection point between the feeder and the radiating element to a first end of the first notch structure, wherein the first end of the first notch structure is an end near the second notch structure.

16. The mobile terminal according to claim 15, wherein a first transfer switch is disposed on the second notch structure, and a second transfer switch is disposed on the radiating element; and wherein a difference between L3 and L4 approximates a fourth specified threshold, wherein L3 is a length of a current path from a connection point between the first transfer switch and the second notch structure to a far end of the second notch structure from the radiating element; and L4 is a length of a current path from the second transfer switch to the first end of the first notch structure.

17. The mobile terminal according to claim 15, further comprising:

a third notch structure, wherein the third notch structure is located at a far end of the radiating element from the second notch structure, the third notch structure is coupled to the radiating element, and a far end of the third notch structure far from the radiating element is grounded, wherein a difference between L5 and L6 approximates the third specified threshold, wherein L5 is a current path length of the third notch structure; and L6 is a length of a current path from a connection point between the feeder and the radiating element to a second end of the radiating element, wherein the second end of the radiating element is an end near the third notch structure.

18. The mobile terminal according to claim 17, wherein a third transfer switch is disposed on the third notch structure, and a fourth transfer switch is disposed on the radiating element; and wherein a difference between L7 and L8 approximates the fourth specified threshold, wherein L7 is a length of a current path from a connection point between the third transfer switch and the third notch structure to a far end of the third notch structure from the radiating element; and L8 is a length of a current path from the fourth transfer switch to the second end of the radiating element.

* * * * *